(12) United States Patent
Anderson et al.

(10) Patent No.: US 8,553,567 B1
(45) Date of Patent: Oct. 8, 2013

(54) PACKET DROPPING BASED ON RF CONDITIONS

(75) Inventors: Howard Bishop Anderson, Ashburn, VA (US); Vijay Rudraraju, Herndon, VA (US); Esmail Hejazi Dinan, Herndon, VA (US); Hemanth Balaji Pawar, Herndon, VA (US); Daniel A. Vivanco, Herndon, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 464 days.

(21) Appl. No.: 12/139,346

(22) Filed: Jun. 13, 2008

(51) Int. Cl.
*G01R 31/08* (2006.01)

(52) U.S. Cl.
USPC .......................................................... 370/243

(58) Field of Classification Search
USPC ........................................ 370/230, 412, 337
See application file for complete search history.

(56) References Cited

U.S. PATENT DOCUMENTS

| | | | |
|---|---|---|---|
| 6,885,638 B2 | 4/2005 | Xu et al. | |
| 6,947,756 B2 | 9/2005 | Khan et al. | |
| 6,977,930 B1* | 12/2005 | Epps et al. | 370/392 |
| 7,495,560 B2* | 2/2009 | Easton et al. | 340/572.1 |
| 8,140,104 B2* | 3/2012 | Douglas et al. | 455/522 |
| 2002/0071387 A1* | 6/2002 | Horiguchi et al. | 370/229 |
| 2002/0191250 A1* | 12/2002 | Graves et al. | 359/128 |
| 2003/0119556 A1 | 6/2003 | Khan et al. | |
| 2003/0128665 A1* | 7/2003 | Bernhard et al. | 370/230 |
| 2004/0208183 A1 | 10/2004 | Balachandran et al. | |
| 2005/0073980 A1* | 4/2005 | Thomson et al. | 370/338 |
| 2006/0018277 A1* | 1/2006 | Petrovic et al. | 370/329 |
| 2006/0046737 A1* | 3/2006 | Douglas et al. | 455/452.2 |
| 2006/0084460 A1* | 4/2006 | Matsuo et al. | 455/522 |
| 2007/0060158 A1* | 3/2007 | Medepalli et al. | 455/450 |
| 2007/0104215 A1* | 5/2007 | Wang et al. | 370/458 |
| 2007/0286131 A1* | 12/2007 | Wu et al. | 370/337 |
| 2008/0025216 A1* | 1/2008 | Singh et al. | 370/231 |
| 2008/0080414 A1* | 4/2008 | Thubert et al. | 370/328 |
| 2008/0186918 A1* | 8/2008 | Tinnakornsrisuphap et al. | 370/331 |
| 2008/0248807 A1* | 10/2008 | Kim et al. | 455/453 |
| 2009/0086629 A1* | 4/2009 | Zhang et al. | 370/230 |
| 2009/0168681 A1* | 7/2009 | Moon | 370/312 |
| 2010/0182944 A1* | 7/2010 | Kish | 370/312 |
| 2010/0189063 A1* | 7/2010 | Kokku et al. | 370/329 |
| 2011/0044167 A1* | 2/2011 | Kalonji et al. | 370/230.1 |
| 2012/0063379 A1* | 3/2012 | Kish | 370/312 |
| 2012/0287856 A1* | 11/2012 | Ketchum et al. | 370/328 |
| 2013/0077477 A1* | 3/2013 | Daraiseh et al. | 370/225 |

OTHER PUBLICATIONS

Wikipedia, "Random Early Detection," wikipedia.com, Mar. 29, 2008, 2 pages, http://en.wikipedia.org/wiki/Random_early_detection.

Wikipedia, "Weighted Random Early Detection," wikipedia.com, Nov. 25, 2007, 1 page, http://en.wikipedia.org/wiki/Weighted_random_early_detection.

* cited by examiner

*Primary Examiner* — Asad Nawaz
*Assistant Examiner* — Syed S Ali
(74) *Attorney, Agent, or Firm* — O'Brien Jones, PLLC (57) ABSTRACT

A first indicator of RF conditions that is associated with a first device is received. A second indicator of RF conditions that is associated with a second device is received. An indicator of throughput for one or more network elements is received. A first packet is received from the first device. A second packet is received from the second device. The first packet is sent and the second packet is not sent based on the first indicator of RF conditions, the second indicator of RF conditions, and the indicator of throughput.

12 Claims, 6 Drawing Sheets

PACKET DROPPING BASED ON RF CONDITIONS

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). The European Telecommunications Standards Institute (ETSI) has also promulgated a standard known as long term evolution (LTE). Additional standards such as the fourth generation communication system (4G) are also being pursued. These standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network including processes for registering on the network, carrier modulation, frequency bands of operation, and message formats.

OVERVIEW

A method of dropping packets is disclosed. A first indicator of RF conditions that is associated with a first device is received. A second indicator of RF conditions that is associated with a second device is received. An indicator of throughput for one or more network elements is received. A first packet is received from the first device. A second packet is received from the second device. The first packet is sent and the second packet is not sent based on the first indicator of RF conditions, the second indicator of RF conditions, and the indicator of throughput.

A method of scheduling packets is disclosed. A first packet associated with a first wireless device is stored in a buffer. The first wireless device is associated with a first indicator of wireless throughput. The first packet in the buffer is replaced with a second packet based on a second indicator of wireless throughput that is associated with a second wireless device. The second packet is associated with the second wireless device. The second packet is sent to a communication link.

A packet buffering and retransmission system is disclosed. A buffer is configured to receive packets associated with a plurality of indicators of wireless throughput. Packet replacement logic is configured to replace a packet stored in the buffer based on a first indicator of wireless throughput associated with an incoming packet, and a second indicator of wireless throughput associated with the packet stored in the buffer.

DETAILED DESCRIPTION

Figure 1:
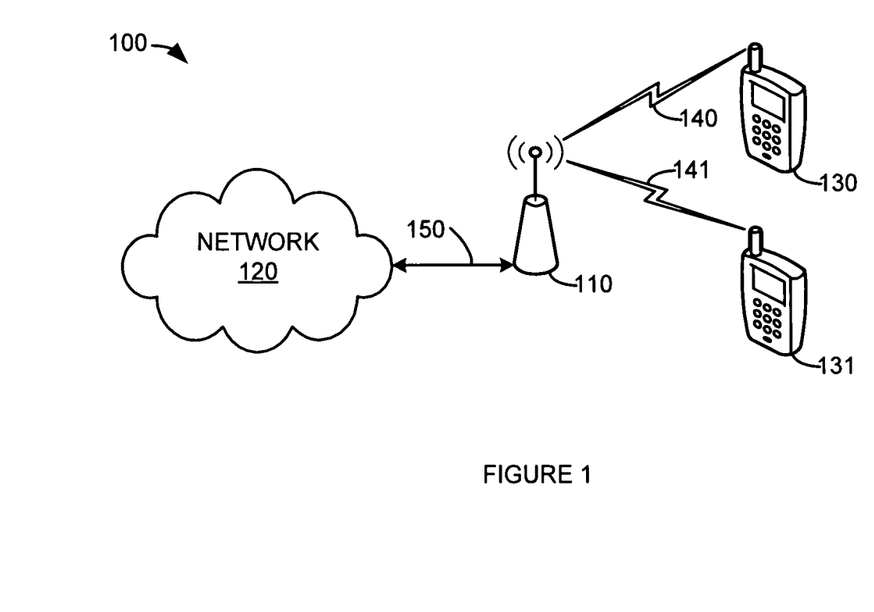
FIG. 1 is a block diagram illustrating a communication system.

FIG. 1 is a block diagram illustrating a communication system. In FIG. 1, communication system 100 comprises base station 110, network 120, wireless device 130, wireless device 131, wireless link 140, wireless link 141, and backhaul link 150.

Wireless device 130 and wireless device 131 may be operatively coupled to base station 110 by wireless links 140 and 141, respectively. Base station 110 is operatively coupled to network 120 via backhaul link 150. Thus, wireless device 130 and wireless device 131 may be operatively coupled to network 120.

Wireless device 130 or wireless device 131 may be any device, system, combination of devices, or other such communication platform capable of communicating with base station 110 via wireless links 140 and 141, respectively. Wireless device 130 or wireless device 131 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange data with base station 110 via wireless links. Other types of communication platforms are possible.

Base station 110 may be any wireless system that provides the air interface to wireless device 130 and wireless device 131, and communication connectivity to network 120 via backhaul link 150. Examples of base stations that may be utilized include, base transceiver stations (BTSs), radio base stations (RBSs), Node B, enhanced Node B (eNBs) and others. Base stations may include a number of elements known to those skilled in the art comprising a transceiver, power amplifier, combiner, duplexer, antenna and control function.

Network 120 may comprise a computer, a network, or a collection of computers and networks that couple, link, or otherwise operatively provide wireless device 130 and wireless device 131 with communication service. It should be understood that network 120 may comprise secondary data networks. For example, network 120 may include a backhaul network, a local network, a long distance network, a packet network, or any combination thereof, as well as other types of networks. Network 120 may be or include an access service network (ASN), an access service network gateway (ASN-GW), wireless local access network access gateway (WAG), packet data gateway (PDG), mobile switching center (MSC) and packet data serving node (PDSN).

Wireless device 130 and wireless device 131 may establish communication sessions with base station 110 in order to receive communication services via network 120 and via wireless links 140 and 141, respectively. These services may include voice services and data services. These services may include but are not limited to telephone services, long distance services, mobile voice services, mobile data services, push-to-talk services, internet services, web browsing, email, pictures, picture messaging, video, video messaging, audio, voicemail, music, MP3's, ring tones, stock tickers, news alerts, and so on.

The amount of data that can be exchanged via wireless links 140 and 141 depends upon air interface factors such as the number of wireless devices communicating via base station 110, interference, clutter, morphology, wireless device location, signal to interference and noise ratio (SINR) and wireless device mobility. To account for these air interface variations, a wireless standard may utilize multiple modulation and coding schemes. This allows wireless devices with poor air interface conditions to utilize a low bit rate modulation with a high redundancy coding scheme. Wireless devices with good air interface conditions may utilize higher bit rate modulation with a low or no redundancy coding scheme. Thus, wireless devices with good air interface conditions can exchange more data with base station 110 in a given time (or symbol) and frequency block than a wireless device with poor air interface conditions. A time and frequency block may be referred to as a slot.

For example, WiMAX specifies modulation and coding scheme combinations that include: QPSK and ½ CTC 6x; QPSK and ½ CTC 4x; QPSK and ½ CTC 2x; QPSK and ½ CTC 1x; 16 QAM and ½ CTC; 16 QAM and ¾ CTC; 64 QAM and ½ CTC; 64 QAM and ⅔ CTC; 64 QAM and ¾ CTC; and, 64 QAM and ⅚ CTC. With a 10 MHz system channel bandwidth, these modulation and coding schemes may provide communication capacity that may range from approximately 18 to approximately 560 bits per slot. Thus, the amount of information conveyed to base station 110 over wireless links 140 and 141 depends upon the modulation and coding schemes that wireless device 130 and wireless device 131 are using. In turn, the modulation and coding scheme that each wireless device 130 or wireless device 131 is using is dependent upon the RF conditions that wireless device 130 or wireless device 131 is operating in.

In an embodiment, backhaul link 150 may have a maximum throughput. In other words, backhaul link 150 may only be able to carry a maximum number of bits (or bytes) per second (e.g., 10 Mbits/s). Likewise, network 120, or an element of network 120 may have a maximum throughput. Base station 110 may measure the maximum throughput of backhaul link 150. Base station 110 may measure the maximum throughput of network 120 or an element of network 120. Base station 110 may use aspects of a communication protocol to discover the maximum throughput of backhaul link 150 or network 120. Base station 110 may receive an indicator of maximum throughput from another device. Base station 110 may be configured to only send a maximum throughput to backhaul link 150.

In an example, base station 110 may discover the maximum throughput of backhaul link 150 or network 120 by sending packets at successively higher rates until backhaul link 150 or network 120 starts dropping the sent packets. In another example, backhaul link 150, network 120, or an element of network 120 may inform base station 110 of the maximum throughput that base station 110 can send to network 120 via backhaul link 150. In another example, base station 110 may discover the maximum throughput of backhaul link 150 or network 120 by monitoring the transmission control protocol (TCP) congestion avoidance algorithm.

In an embodiment, the maximum throughput that can be carried by backhaul link 150 or network 120 may be less than the maximum throughput that can be carried over wireless links 140 and 141. For example, consider a case where backhaul link 150 or network 120 has a maximum throughput of 5 Mbps. Wireless device 130 or wireless device 131 when operating using 16 QAM and ½ CTC may send as much as 9.41 Mbps to base station 110. Thus, the maximum throughput sent by wireless device 130 and wireless device 131 may exceed the throughput capability of backhaul link 150 or network 120.

Before sending packets to backhaul link 150, base station 110 may place packets received from wireless device 130 or wireless device 131 in a buffer. Base station 110 may then send these packets to backhaul link 150 at a later time than they were received. When the maximum throughput sent by wireless device 130 and wireless device 131 exceeds the throughput capability of backhaul link 150 or network 120, this buffer may become full. When this buffer is full, or nearly full, packets received from wireless device 130 or wireless device 131 may be discarded by base station 110. This may be referred to as tail-drop.

In an embodiment, base station 110 may choose a packet to be discarded (dropped) based on an indicator of RF conditions associated with the wireless device sending the packets. Base station may choose a packet to be discarded based on an indicator of RF conditions associated with wireless device 130, an indicator of RF conditions associated with wireless device 131, and an indicator of the maximum throughput of backhaul link 150, or network 120. In an embodiment, an indicator of RF conditions for wireless device 130 or wireless device 131 may be the modulation and coding scheme associated with each wireless device 130 and 131, respectively. In an embodiment, an indicator of RF conditions may be a SINR associated with wireless device 130 or wireless device 131.

In an embodiment, base station 110 may choose to drop a packet from wireless device 130 and send a packet from wireless device 131 because the indicators of RF conditions associated with wireless devices 130 and 131 indicates that RF conditions associated with wireless device 130 are better than the RF conditions associated with wireless device 131. In an embodiment, base station 110 may choose to drop a packet from wireless device 130 and send a packet from wireless device 131 because the indicators of RF conditions associated with wireless devices 130 and 131 indicates that a throughput associated with wireless device 130 is greater than a throughput associated with wireless device 131.

In an embodiment, base station 110 may store a first packet from wireless device 130 in a buffer. Then, base station 110 may receive a second packet from wireless device 131 that is to be stored in the buffer. Based on the indicators of RF conditions associated with wireless devices 130 and 131, base station 110 may replace the first packet in the buffer with the second packet. Base station 110 may replace the first packet in the buffer with the second packet because the indicators of RF conditions associated with wireless device 130 and 131 indicate that wireless device 131 is associated with poorer RF conditions than wireless device 130. Base station 110 may replace the first packet in the buffer with the second packet because the indicators of RF conditions associated with wireless device 130 and 131 indicate that wireless device 131 is associated with lower throughput than wireless device 130.

In an embodiment, base station 110 may select a packet from wireless device 130 or 131 to be dropped based on a weighted random early detection scheme (WRED). In an embodiment, base station 110 may associate the drop probabilities of a WRED scheme with the indicators of RF conditions. In an embodiment, base station 110 may associate drop probabilities of a WRED scheme with wireless throughputs that are associated with wireless devices 130 and 131, respectively.

WRED monitors how full at least one buffer is and drops incoming or stored packets based on statistical probabilities. WRED may monitor an indicator of the remaining space in a buffer. If the buffer is almost empty, all incoming packets are accepted, and/or all stored packets are retained. As the buffer fills, the global probability for dropping an incoming or stored packets grows too. In an embodiment, when the buffer is full, the global probability has reached 1 and all incoming packets are dropped. In an embodiment, when the buffer is full, the global probability has reached 1 and a stored packet is dropped. The stored packet to be dropped may be selected based on an indicator of RF condition associated with that packet.

In an embodiment, a probability for dropping a specific packet is determined based on the global probability and a drop probability associated with the indicator of RF conditions associated with that packet. For example, packets associated with a first indicator of RF conditions may be associated with a first drop probability represented by the variable A. Packets associated with a second indicator of RF conditions may be associated with a second drop probability represented by the variable B. The global probability at a given point in time may be represented by the variable G. In this case, the probability ($P_1$) that a first packet that is associated with the first drop probability will be dropped may be based on: $P_1=A*G$. The probability ($P_2$) that a second packet associated with the second drop probability will be dropped may be based on: $P_2=B*G$.

To illustrate, consider the case where: (1) the global probability is 0.5; (2) the first drop probability is 0.5; and, (3) the second drop probability is 1.5. Thus, when base station 110 determines if a packet (or which packet) should be dropped, the probability that the first packet will be dropped is: $P_1=0.5*0.5=0.25$. The probability that the second packet will be dropped is: $P_2=0.5*1.5=0.75$. Thus, it is three times more likely that the second packet will be dropped than the first packet. This increased likelihood is based on the drop probabilities (i.e., A and B) associated with the first and second packets that may be associated with a first and second indicator of RF conditions, respectively.

Figure 2:
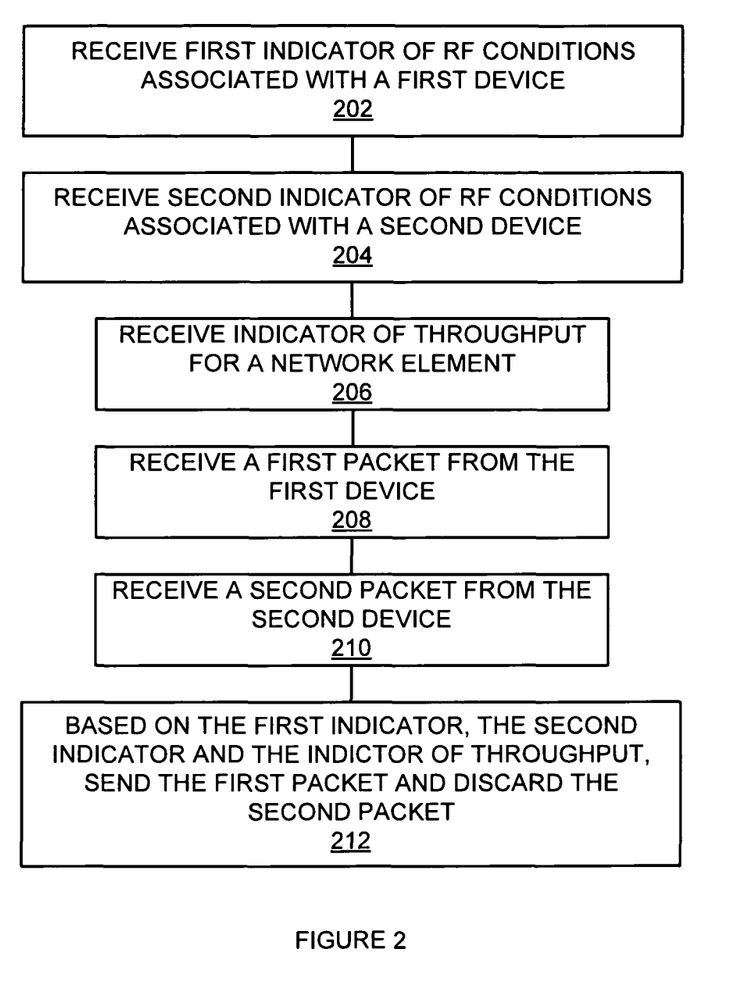
FIG. 2 is a flowchart illustrating a method of dropping packets.

FIG. 2 is a flowchart illustrating a method of dropping packets. The steps illustrated in FIG. 2 may be performed by one or more elements of communication system 100.

A first indicator of RF conditions associated with a first device is received (202). For example, base station 110 may receive or determine an indicator of RF conditions associated with wireless device 130. This first indictor of RF conditions may be, or be based on, the modulation and coding scheme associated with wireless device 130. This first indicator or RF conditions may be, or be based on, a wireless throughput associated with wireless device 130. This first indicator of RF conditions may be, or be based on, a SINR associated with wireless device 130.

A second indicator of RF conditions associated with a second device is received (204). For example, base station 110 may receive or determine an indicator of RF conditions associated with wireless device 131.

An indicator of throughput for a network element is received (206). For example, base station 110 may receive an indicator of the maximum throughput of network 120, or an element of network 120. In another example, base station 110 may receive an indicator of the maximum throughput of backhaul link 150. In another example, base station 110 may receive an indicator of the congestion of network 120. In another example, base station 110 may receive an indication that network 120 is dropping packets. In another example, base station 110 may monitor the TCP/IP congestion algorithm to determine an indicator of throughput.

A first packet is received from the first device (208). For example, base station 110 may receive a first packet from wireless device 130. Base station 110 may associate this first packet with the first indicator of RF conditions.

A second packet is received from the second device (210). For example, base station 110 may receive a second packet from wireless device 131. Base station 110 may associate this first packet with the second indicator of RF conditions.

Based on the first indicator of RF conditions, the second indicator of RF conditions, and the indicator of throughput, the first packet is sent and the second packet is discarded. For example, base station 110 may send the first packet and discard the second packet based on the indicators of RF conditions showing that wireless device 130 is operating under poorer RF conditions than wireless device 131. In another example, base station 110 may send the first packet and discard the second packet based on drop probabilities associated with the indicators of RF conditions. The drop probabilities may be used by a WRED packet dropping scheme. In an embodiment, base station 110 may send the first packet and discard the second packet by storing the second packet in the buffer and then replacing the second packet in the buffer with the first packet.

Figure 3:
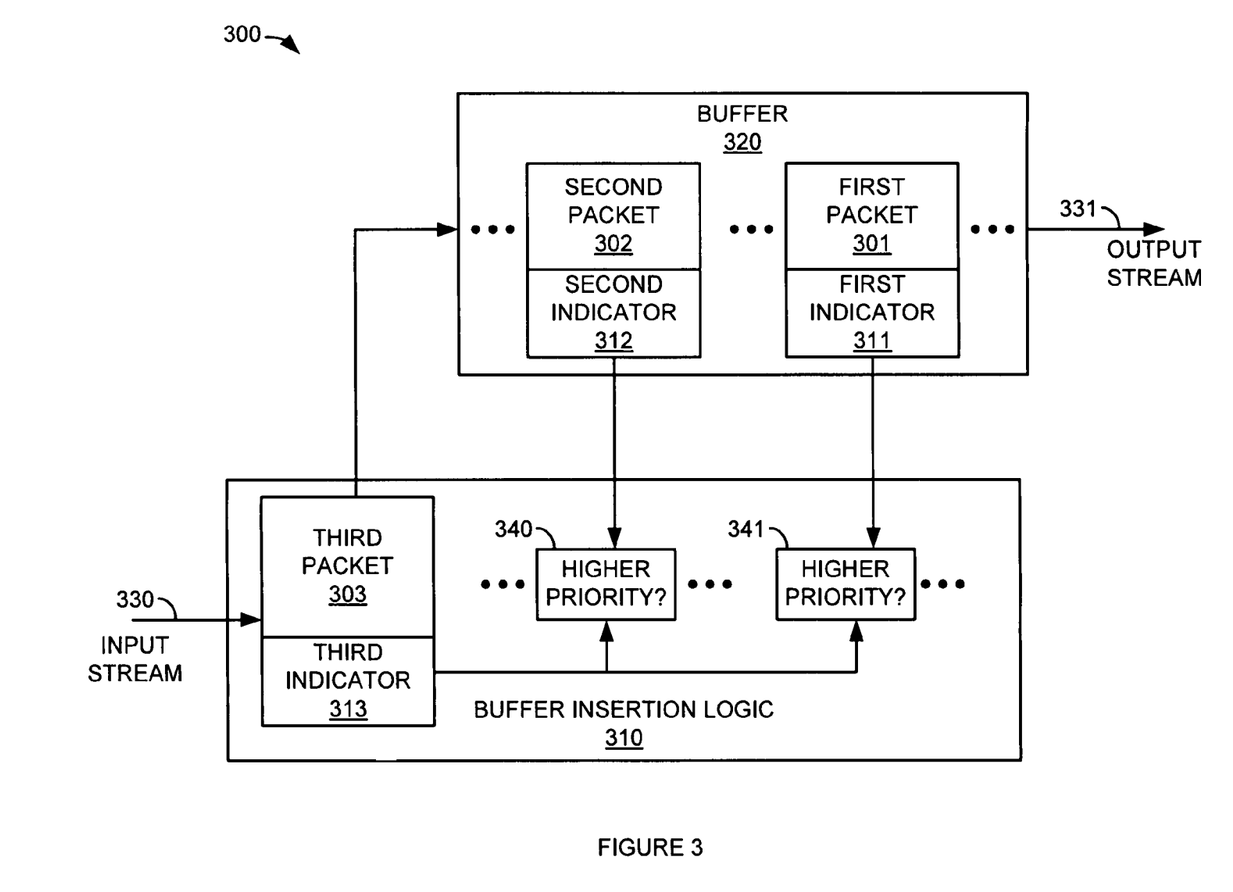
FIG. 3 is a block diagram illustrating a packet buffering system.

FIG. 3 is a block diagram illustrating a packet buffering system. In FIG. 3, packet buffering system 300 comprises: buffer insertion logic 310; buffer 320; input stream 330; and output stream 331. Buffer insertion logic 310 receives input stream 330. Input stream 330 is comprised of packets. Buffer insertion logic 310 includes third packet 303, priority check 340, and priority check 341. Buffer insertion logic 310 also includes third indicator 313. Third indicator 313 is associated with third packet 303.

Buffer 320 produces output stream 331. Buffer 320 contains first packet 301 and second packet 302. Buffer 320 also contains first indicator 311 and second indicator 312. First indicator 311 and second indicator 312 are associated with first packet 301 and second packet 302, respectively.

First indicator 311, second indicator 312, and third indicator 313 may be associated with indicators of RF conditions. For example, these indicators may be, or be based on, the modulation and coding scheme associated with the wireless devices that sent these respective packets. In another example, these indicators may be, or be based on, the wireless throughputs associated with the wireless devices that sent these respective packets. These indicators may be, or be based on, a SINR associated with the wireless devices that sent these respective packets.

Input stream 330 is a stream of traffic, comprised of packets, received by packet buffering system 300. For example, input stream 330 may be an aggregation of the streams of packets received from wireless device 130 and wireless device 131. First packet 301, second packet 302, and third packet 303 are all packets that were received by packet buffering system 300 via input stream 330.

First packet 301 and second packet 302 have been inserted into buffer 320 by buffer insertion logic 310. Thus, in FIG. 3, first packet 301 and second packet 302 are shown contained within buffer 320. Buffer 320 may be configured as a first in first out buffer. Buffer 320 may be configured as a first in, highest priority out buffer. The priorities may be based on the indicators associated with the packets in buffer 320. The indicators associated with the packets in buffer 320 may be based on indicators of RF conditions.

Packets are removed from buffer 320 and sent in output stream 331. Output stream 331 is a stream of traffic comprised of packets received by packet buffering system 300. However, some packets received by packet buffering system 300 that are within the buffer size of buffer 320, or have been received by buffer insertion logic 310, may have been removed or discarded based on the indicators associated with those packets before these packets are included in output stream 331.

Buffer insertion logic 310 receives a third packet 303 from input stream 330. If there is not room in buffer 320 for third packet 303, buffer insertion logic 310 is configured to compare third indicator 313 to at least a portion of the indicators associated with the packets already stored in buffer 320. This is illustrated in FIG. 3 by priority check 340 which receives an input from the second indicator 312 and the third indicator 313. This is also illustrated by priority check 341 which receives an input from the first indicator 311 and the third indicator 313.

Buffer insertion logic 310 receives third packet 313 from input stream 330. Buffer insertion logic 310 uses priority check 340 and priority check 341 to determine if third packet 303 has a higher priority than the first packet 301, or the second packet 302. If the third packet 303 has a higher priority than the second packet 302, based on the third indicator 313 and the second indicator 312, buffer insertion logic 310 may then replace the second packet 302 with the third packet 303 in buffer 320. Buffer insertion logic 310 may determine priority such that packets associated with poorer RF conditions are given a higher priority. In other words, packets associated with poorer RF conditions would replace packets associated with better RF conditions (as indicated, for example, by first indicator 311, second indicator 312, and third indicator 313) in buffer 320 before these packets are sent in output stream 331 to a communication link.

Figure 4:
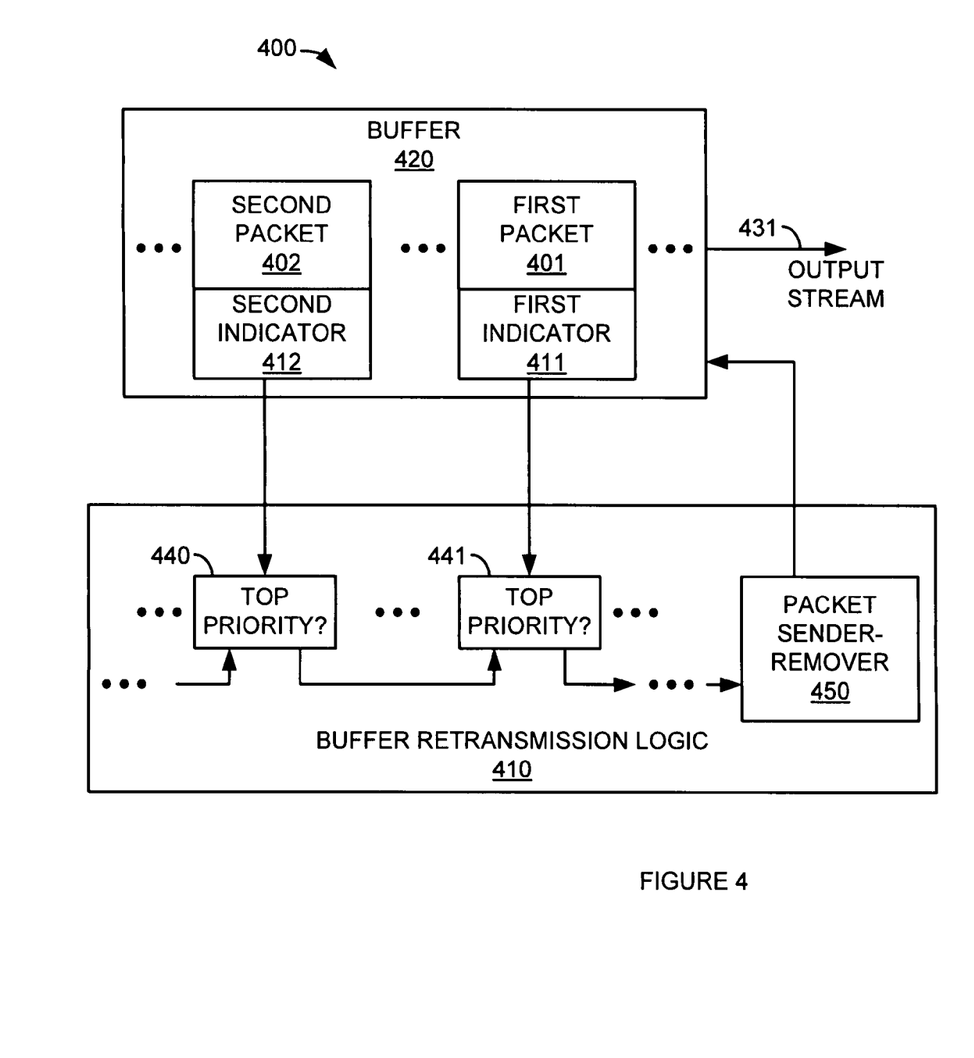
FIG. 4 is a block diagram illustrating a packet buffer retransmission system.

FIG. 4 is a block diagram illustrating a packet buffer retransmission system. In FIG. 4, packet buffer retransmission system 400 comprises: buffer retransmission logic 410; buffer 420; and output stream 431. Buffer retransmission logic 410 includes priority check 440, priority check 441, and packet sender-remover 450.

Buffer 420 produces output stream 431 under the control of packet sender-remover 450. Buffer 420 contains first packet 401 and second packet 402. Buffer 420 also contains first indicator 411 and second indicator 412. First indicator 411 and second indicator 412 are associated with first packet 401 and second packet 402, respectively.

First indicator 401 and second indicator 402 may be associated with indicators of RF conditions. For example, these indicators may be, or be based on, the modulation and coding scheme associated with the wireless devices that sent these respective packets. In another example, these indicators may be, or be based on, the wireless throughputs associated with the wireless devices that sent these respective packets. In another example, these indicators may be, or be based on, the SINR associated with the wireless devices that sent these respective packets.

First packet 401 and second packet 402 are stored by packet buffer retransmission system 400. In an example, first packet 401 and second packet 402 may be packets associated with wireless device 130 and wireless device 131, respectively.

First packet 401 and second packet 402 are stored in buffer 420. Thus, in FIG. 4, first packet 401 and second packet 402 are shown contained within buffer 420. Buffer 420 may be configured as a first in, highest priority out buffer. The priorities may be based on the indicators associated with the packets in buffer 420. The indicators associated with the packets in the buffer may be based on indicators of RF conditions.

Packets are removed from buffer 420 and sent in output stream 431 under the control of packet sender-remover 450. Output stream 431 is a stream of traffic comprised of packets stored by packet buffer retransmission system 400.

Buffer retransmission logic 410 is configured to compare the indicators associated with each packet stored in buffer 420 to determine the packet with the highest priority. The packet with the highest priority may be determined by the indicators associated with those packets. This is illustrated in FIG. 4 by priority check 440 which receives an input from the second indicator 412 and another priority check (not shown). This is also illustrated by priority check 441 which receives an input from the first indicator 411 and priority check 440. An indicator of the highest priority packet is received by packet sender-remover 450.

Buffer retransmission logic 410 uses priority check 440 and priority check 441 to determine the packet stored in buffer 420 with the highest priority. If the second packet 402 has a higher priority than the first packet 401, based on the second indicator 412 and the first indicator 411, packet sender-remover 450 may then remove the second packet 402 from buffer 420 and send it to output stream 431. Packet retransmission logic 410 may remove and send packet 402 to output stream 431 before first packet 401 regardless of the order that first packet 401 and second packet 402 were stored in buffer 420.

Buffer retransmission logic 410 may determine priority such that packets associated with poorer RF conditions are given a higher priority. In other words, packets associated with poorer RF conditions would be removed from buffer 420 and sent to output stream 431 before packets associated with better RF conditions. The packets sent to output stream 431 may also be sent to a communication link.

Figure 5:
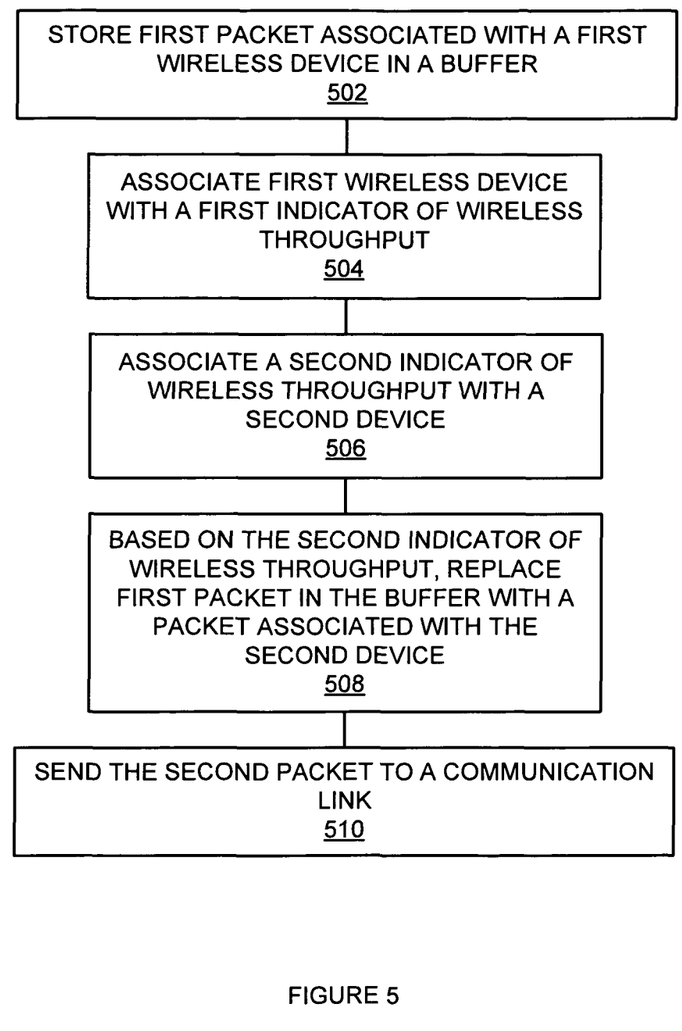
FIG. 5 is a flowchart illustrating a method of scheduling packets.

FIG. 5 is a flowchart illustrating a method of scheduling packets. The steps illustrated in FIG. 5 may be performed by one or more elements of communication system 100.

A first packet associated with a first wireless device is stored in a buffer (502). For example, base station 110 may store a first packet associated with wireless device 130 in a buffer. A first wireless device is associated with a first indicator of wireless throughput (504). For example, base station 110 may associate wireless device 130 with a first modulation and coding scheme. Since the amount of information per slot that may be sent by wireless device 130 is determined by the modulation and coding scheme that wireless device 130 is using, the modulation and coding scheme being used by wireless device 130 is an indicator of wireless throughput.

A second wireless device is associated with a second indicator of wireless throughput (506). For example, base station 110 may associate wireless device 131 with a second modulation and coding scheme.

Based on the second indicator of wireless throughput, the first packet in the buffer is replaced with a packet associated with the second device (508). For example, base station 110 may replace the first packet in a buffer with a second packet associated with wireless device 131 based on the indicator of wireless throughput associated with wireless device 131. In an example, base station 110 may replace the first packet because the first and second indicators of wireless throughput indicate that wireless device 131 is associated with poorer RF conditions than wireless device 130. In an example, base station 110 may replace the first packet because the first and second indicators of wireless throughput indicate that wireless device 131 is associated lower wireless throughput than wireless device 130. In an example, base station 110 may replace the first packet because the first and second indicators of wireless throughput indicate that wireless device 131 is associated lower SINR than wireless device 130.

The second packet is sent to a communication link (510). For example, base station 110 may send the second packet to backhaul link 150. The second packet may be selected to be sent before other packets in the buffer based on the second indicator of wireless throughput. In an example, base station 110 may select the second packet to be sent to the communication link because wireless device 131 is associated with the poorer RF conditions than the wireless devices associated with other packets in the buffer. In an example, base station 110 may select the second packet to be sent to the communication link because wireless device 131 is associated with a lower wireless throughput than the wireless devices associated with the other packets in the buffer. In an example, base station 110 may select the second packet to be sent to the communication link because wireless device 131 is associated with a lower SINR than the wireless devices associated with other packets in the buffer.

The methods, systems, and logic described above may be implemented with or executed by one or more computer systems. The methods described above may also be stored on a computer readable medium. Many of the elements of communication system 100, packet buffering system 300, or packet buffer retransmission system 400 may be, comprise, include, or be implemented by computers systems. This includes, but is not limited to: base station 110; network 120, wireless device 130, wireless device 131, backhaul link 150; buffer 320; buffer insertion logic 310; buffer 420; and, buffer retransmission logic 410.

Figure 6:
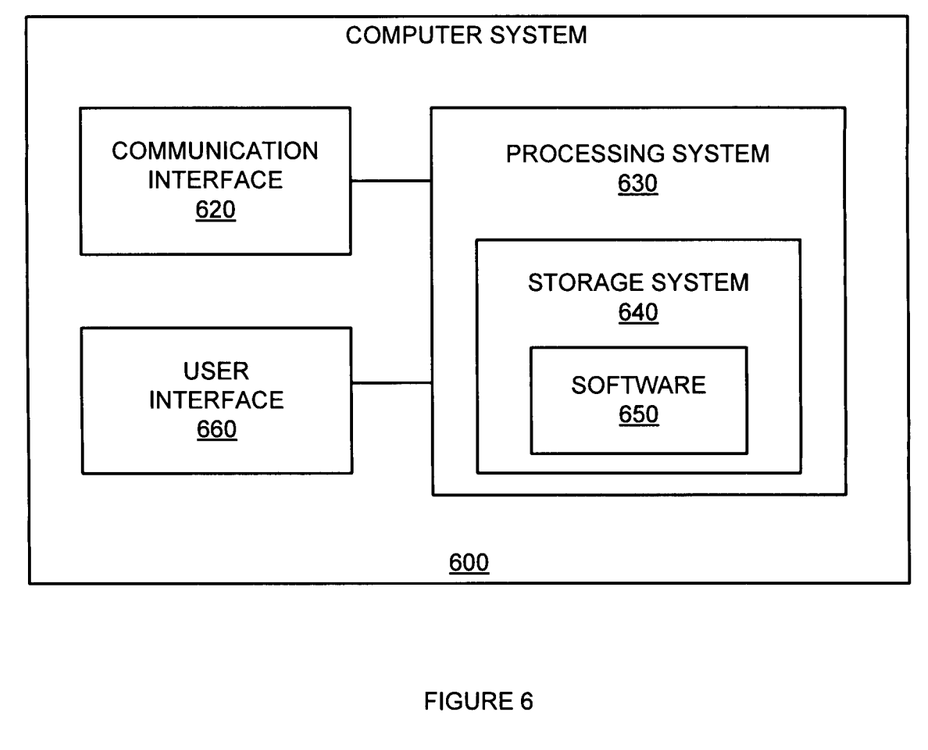
FIG. 6 is a block diagram of a computer system.

FIG. 7 illustrates a block diagram of a computer system. Computer system 700 includes communication interface 720, processing system 730, and user interface 760. Processing system 730 includes storage system 740. Storage system 740 stores software 750. Processing system 730 is linked to communication interface 720 and user interface 760. Computer system 700 could be comprised of a programmed general-purpose computer, although those skilled in the art will appreciate that programmable or special purpose circuitry and equipment may be used. Computer system 700 may be distributed among multiple devices that together comprise elements 720-760.

Communication interface 720 could comprise a network interface, modem, port, transceiver, or some other communication device. Communication interface 720 may be distributed among multiple communication devices. Processing system 730 could comprise a computer microprocessor, logic circuit, or some other processing device. Processing system 730 may be distributed among multiple processing devices. User interface 760 could comprise a keyboard, mouse, voice recognition interface, microphone and speakers, graphical display, touch screen, or some other type of user device. User interface 760 may be distributed among multiple user devices. Storage system 740 could comprise a disk, tape, integrated circuit, server, or some other memory device. Storage system 740 may be distributed among multiple memory devices.

Processing system 730 retrieves and executes software 750 from storage system 740. Software 750 may comprise an operating system, utilities, drivers, networking software, and other software typically loaded onto a computer system. Software 750 could comprise an application program, firmware, or some other form of machine-readable processing instructions. When executed by processing system 730, software 750 directs processing system 730 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of dropping packets at an access point wirelessly coupled to a plurality of devices operatively coupled to a network, comprising:
    receiving, by the access point, a first indicator of throughput capacity of with a wireless link between the access point and the first device;
    receiving, by the access point, a second indicator of throughput capacity of with a wireless link between the access point and the second device;
    receiving, by the access point, a third indicator of throughput capacity of with a wireless link between the access point and a third device;
    discovering a throughput capacity of a backhaul link between the access point and the network;
    receiving, at a buffer of the access point, a first packet from the first device;
    receiving, at a buffer of the access point, a second packet from the second device;
    receiving, at a buffer of the access point, a third packet from the third device;
    discarding the third packet from the buffer of the access point, when the third indicator of throughput capacity is greater than the throughput capacity of the second device, a combined throughput capacity of the first device, second device, and third device, and available space in the buffer meets a space availability criteria; and,
    sending, by the access point to the network, the first packet and dropping the second packet based on the first indicator of throughput capacity, the second indicator of throughput capacity, and the discovered throughput capacity of the backhaul link, when the first indicator of throughput capacity and the second indicator of throughput capacity indicate that the throughput capacity of the first wireless device is less than the throughput capacity of the second wireless device.

2. The method of claim 1, wherein the first indicator of throughput capacity is a first modulation and coding scheme, and the second indicator of throughput capacity is a second modulation and coding scheme.

3. The method of claim 1, wherein sending to the network the first packet and dropping the second packet comprises:
    storing the second packet in the buffer;
    replacing the second packet with the first packet in the buffer; and
    transmitting the packet stored in the buffer to the network.

4. A method of dropping packets at an access point wirelessly coupled to a plurality of devices operatively coupled to a network, comprising:
    receiving, by the access point, a first indicator of RF conditions associated with a wireless link between the access point and a first device;
    receiving, by the access point, a second indicator of RF conditions associated with a wireless link between the access point and a second device;

receiving, by the access point, a third indicator of RF conditions associated with a wireless link between the access point and a third device;

discovering a throughput capacity of a backhaul link between the access point and the network;

receiving, at a buffer of the access point, a first packet from the first device;

receiving, at the buffer of the access point, a second packet from the second device;

receiving, at the buffer of the access point, a third packet from the third device;

associating a first drop probability with the first indicator of RF conditions, wherein the first drop probability is proportional to the quality of the associated RF conditions;

associating a second drop probability with the second indicator of RF conditions, wherein the second drop probability is proportional to the quality of the associated RF conditions;

associating a third drop probability with the third indicator of RF conditions, wherein the third drop probability is proportional to the quality of the associated RF conditions;

selecting the second packet to be dropped, when the throughput capacity of the backhaul link meets a throughput criteria and when the second drop probability is greater than the first drop probability; and selecting the third packet to be dropped when the third drop probability is greater than the second drop probability and available space in the buffer meets a space availability criteria.

5. The method of claim 4, wherein selecting the second packet to be dropped comprises:

storing the second packet in the buffer; and replacing the second packet with the first packet in the buffer, and selecting the second packet to be dropped is further based on an indicator of unfilled space in the buffer.

6. The method of claim 5, wherein the first packet is selected to be stored in the buffer based on the indicator of unfilled space in the buffer and the first drop probability.

7. A method of scheduling packets, comprising:

storing, in a buffer of an access point, a first packet associated with a first wireless device operatively coupled to the access point, wherein the first wireless device is associated with a first indicator of wireless throughput capacity between the access point and the first wireless device;

receiving a second packet associated with a second wireless device operatively coupled to the access point, wherein the second wireless device is associated with a second indicator of wireless throughput capacity between the access point and the second wireless device;

replacing the first packet in the buffer with the second packet, when the first indicator of wireless throughput capacity and the second indicator of wireless throughput capacity indicate that the wireless throughput capacity of the first wireless device is greater than the wireless throughput capacity of the second wireless device, a combined throughput capacity of the first indicator of wireless throughput capacity and the second indicator of wireless throughput capacity meets a throughput criteria, and the available space in the buffer meets a space availability criteria;

receiving a third packet associated with a third wireless device operatively coupled to the access point, wherein the third wireless device is associated with a third indicator of wireless throughput capacity between the access point and the third wireless device;

discarding the third packet, when the third indicator of wireless throughput indicates that the wireless throughput of the third wireless device is greater than the wireless throughput of the second wireless device, a combined throughput of the first indicator of wireless throughput capacity, the second indicator of wireless throughput capacity, and the third indicator of wireless throughput capacity meets a throughput criteria, and the available space in the buffer meets a space availability criteria; and, sending the second packet to a network through a backhaul link between the access point and the network.

8. The method of claim 7, wherein the first indicator of wireless throughput capacity is a first modulation and coding scheme, and the second indicator of wireless throughput capacity is a second modulation and coding scheme.

9. The method of claim 7, wherein first indicator of wireless throughput capacity is a first modulation and coding scheme, the second indicator of wireless throughput capacity is a second modulation and coding scheme, and the third indicator of wireless throughput capacity is a third modulation and coding scheme.

10. A packet buffering and retransmission system, comprising:

a storage system comprising a buffer configured to receive and store packets associated with a plurality of indicators of wireless throughput capacity for transmission to a network through a backhaul link; and, a processing system coupled to the storage system comprising packet replacement logic configured to receive a first indicator of throughput capacity of a wireless link between an access point and a first device;

receive a second indicator of throughput capacity of a wireless link between the access point and a second device;

receive a third indicator of throughput capacity of a wireless link between the access point and a third device;

discover a throughput capacity of the backhaul link between the access point and the network;

receive an indication that a first packet from the first device was received at the buffer;

receive an indication that a second packet from the second device was received at the buffer;

receive an indicator that a third packet from the third device was received at the buffer;

determine to discard the third packet from the buffer when the third indicator of throughput capacity is greater than the throughput capacity of the second device, a combined throughput capacity of the first device, second device, and third device, and available space in the buffer meets a space availability criteria; and initiate sending the first packet and dropping the second packet based on the first indicator of throughput capacity, the second indicator of throughput capacity, and the discovered throughput capacity of the backhaul link, when the first indicator of throughput capacity and the second indicator of throughput capacity indicate that the throughput capacity of the first wireless device is less than the throughput capacity of the second wireless device.

11. The packet buffering and retransmission system of claim 10, wherein the plurality of indicators of wireless throughput capacity are associated with a plurality of modulation and coding schemes.

12. The packet buffering and retransmission system of claim 10, wherein at least one of the plurality of indicators of wireless throughput capacity is based on a signal to interference and noise ratio.

\* \* \* \* \*